United States Patent [19]
Bowden et al.

[11] Patent Number: 4,481,267
[45] Date of Patent: Nov. 6, 1984

[54] INSOLUBLE HEAVY METAL POLYSULFIDE CATHODES

[75] Inventors: William L. Bowden, Nashua; Luverne H. Barnette, Derry, both of N.H.; David L. DeMuth, Waltham, Mass.

[73] Assignee: Duracell Inc., Bethel, Conn.

[21] Appl. No.: 481,181

[22] Filed: Apr. 1, 1983

[51] Int. Cl.$^3$ .................... H01M 4/52; H01M 6/16
[52] U.S. Cl. .................................. 429/194; 429/220; 429/221; 429/223; 429/218
[58] Field of Search ............... 429/194, 221, 218, 191, 429/220, 223

[56] References Cited

U.S. PATENT DOCUMENTS

| | | | |
|---|---|---|---|
| 4,233,375 | 11/1980 | Whittingham et al. | 429/194 |
| 4,237,204 | 12/1980 | Thompson et al. | 429/194 |
| 4,302,520 | 11/1981 | Evans et al. | 429/194 |

FOREIGN PATENT DOCUMENTS 2493607  5/1982  France ........................ 429/218

Primary Examiner—Donald L. Walton
Attorney, Agent, or Firm—Ronald S. Cornell; Israel Nissenbaum

[57] ABSTRACT

Heavy metal polysulfides which are insoluble in non-aqueous electrolytes and having the formula $M_x{}^m (S_y)_z{}^{-2}$ (wherein M is a heavy metal such as iron, cobalt, copper or nickel; S is sulfer; $mx=2z$; and y is greater than two) are utilized as very high energy density cathodes in non-aqueous electrochemical cells.

18 Claims, No Drawings

INSOLUBLE HEAVY METAL POLYSULFIDE CATHODES

This invention relates to metal sulfides and particularly to metal polysulfides utilized as cathode materials in non-aqueous electrochemical cells.

Elemental sulfur has an extremely high theoretical electrochemical capacity (1.6 Ahr/gm) and in fact has been utilized as a cathode in electrochemical cells. However, such use of sulfur has been limited by various shortcomings which severely curtailed the actual attainment of such high capacity and which further limited utilization of sulfur in many cell applications. Sulfur is almost insulative with a very low ionic and electronic conductivity, and at least electronic conductivity of the cathode material is necessary in order to obtain reasonably full utilization thereof. Thus, sulfur cathodes have required massive capacity reducing inclusions of non-cathode active electronic conductors. In solid state cell applications further capacity reducing non-cathode active or low capacity ionic conductors have been further required.

In addition to its low conductivity sulfur has a relatively high vapor pressure and dissolution rate with resultant tendency to reduce cell life by internal cell short circuiting, particularly on storage at elevated temperatures. Sulfur cathodes have thus been generally utilized only in elevated temperature cells wherein the sulfur is in the molten state during operation, with increased conductivity and wherein the molten sulfur is, of necessity, fully contained.

In order to at least partially utilize the inherent capacity of sulfur, metal sulfides such as PbS, AgS and the like were utilized as cathodes, particularly in solid state cells. Though such materials did not have the detrimental high vapor pressure or dissolution of the elemental sulfur they also did not however provide capacities anywhere near that of the theoretical sulfur capacity.

Metal disulfides such as $FeS_2$, $CoS_2$, $NiS_2$ because of their relatively higher sulfur content provided higher capacities than the monosulfide materials and have been effectively utilized in cells particularly in elevated temperature operating cells. The highest sulfide capacity obtained to date is for $FeS_2$ which has a theoretical capacity of about 730 mAhr/gm with about 700 mAhr/gm having been actually obtained. Capacities of such materials were however still not favorably comparative to that of the elemental sulfur.

Another class of metal sulfides, the transition metal intercalation compounds, best exemplified by titanium disulfide ($TiS_2$) while seemingly ideal for rechargeable cells, because of the complete reversibility of the cell intercalation reaction, provided substantially less primary capacity than the other metal sulfides. Such diminution of cell capacity resulted from the fact that the sulfur by itself in the intercalation compounds did not actually take part in cell reaction.

Recently another class of metal sulfides has been utilized as cathodes in electrochemical cells, the alkali metal polysulfides such as $Li_2S_x$ and $Na_2S_x$, with $x<1$. Such materials have in fact provided relatively good capacities however several serious disadvantages have accompanied their use. The non-aqueous electrolytes of cells having the alkali metal polysulfide cathodes have had the tendency of becoming increasingly more viscous with accompanying loss of conductivity and severly reduced discharge rate capability. Additionally, the alkali metal polysulfides are at least partially soluble in common electrolyte solvents and are accordingly likely to cause cell self discharge over extended periods of time.

It is an object of the present invention to provide very high energy density metal sulfides for use as cathode materials in electrochemical cells without the shortcomings of increasing electrolyte viscosity with reduced cell discharge rate capability and internal cell short circuiting.

It is a further object of the present invention to provide non-aqueous electrochemical cells utilizing such metal sulfides in the cathodes thereof.

These and other objects, features and advantages of the present invention will become more evident from the following discussion.

Generally the present invention comprises electrochemical cells having novel very high energy density cathodes comprised of one or more insoluble heavy metal (density $\geq 4$ gm/cc) polysulfides with the formula $M_x{}^m(S_y)_z{}^{-2}$ wherein M is a heavy metal such as iron, cobalt, copper or nickel; S is sulfur; $mx=2z$; and y is greater than 2. Such polysulfides may have theoretical energy densities in excess of 1 Ahr/gm and have been discovered to be substantially insoluble in both aqueous and non-aqueous solvents commonly utilized in electrochemical cells. Furthermore, the heavy metal polysulfides have been shown to have generally amorphous structures in contrast to the prior art metal sulfides. Such amorphous structures in addition to the very high reactive sulfur content is believed to at least in part account for the very high discharge capacities obtained therewith because of enhanced high reactive surface area.

Generally, in metal sulfides all of the sulfur therein is in the $-2$ valence state in direct combination with the metal cations. As a result, only a limited amount of sulfur atoms are contained within the individual molecules. In fact a molar ratio of metal to sulfur rarely, if ever, exceeds 1:3 and is usually 1:2 or less. If contrast thereto the metal polysulfides of the present invention provides sulfur for electrochemical reaction in a ratio of metal to sulfur in excess of 1:3 and generally at least 1:3.5 with ratios in excess of 1:4 being preferred. It appears that groupings of more than two sulfur atoms combine with a shared valency such that the combination has the normal metal sulfide $-2$ valency with 'y' in the aforementioned metal polysulfide formula of $M_x{}^m(S_y)_z{}^{-2}$ being greater than 2.

Examples of heavy metal polysulfides which have been specifically characterized include $CoS_n$ with n having specifically determined values of 4.5; 4.12; 4.82 and 5; $NiS_{4.5}$; $CuS_{3.7}$ and $FeS_{4.5}$. It is understood however that the enumerated polysulfides are those which have been prepared and characterized and that other heavy metals and particularly transition metals such as vanadium, molybdenum, chromium, zinc, manganese and the like as well as other ratios will provide materials having similar characteristics since it is generally the sulfur content of the polysulfides which accounts for the cell capacity.

The polysulfide materials of the present invention are preferably prepared by reacting an excess of soluble heavy metal salt with a soluble alkali metal polysulfide in a fluid medium such as an aqueous solvent. The insoluble precipitate is the metal polysulfide of the present invention.

The following examples illustrate such preferred method of preparing the heavy metal polysulfides of the present invention and the use of such heavy metal polysulfides as high energy density cathode materials in electrochemical cells. It is understood that such examples are illustrative in nature and that other methods for the preparation thereof are possible. Accordingly, the details described in such examples are not to be construed as limitations on the present invention. Unless otherwise indicated all parts are parts by weight.

EXAMPLE I

Cobalt polysulfide ($CoS_x$) was prepared by reaction in aqueous solution between sodium polysulfide and cobaltous sulfate. The sodium polysulfide was prepared by dissolving sodium sulfide hydrate ($Na_2S.9H_2O$) in distilled water with an excess of sulfur powder being added thereto and stirring for several days. The resultant sodium polysulfide solution was filtered into an aqueous solution of $CoSO_4.7H_2O$ with a black amorphous precipitate being formed. Such precipitate was a completely amorphous solid with a chemical analysis showing a cobalt to sulfur ratio of 1:4.5 corresponding to an empirical stoichiometric formula of $CoS_{4.5}$. A DTA of the solid as well as of $CoS_2$ and $CoS$ indicated that such solid was a polysulfide rather than an intimate mix of sulfur and cobalt sulfide. Varying of the sulfur content in the sodium polysulfide provided additional cobalt polysulfides with empirical stoichiometries of $CoS_{4.12}$, $CoS_5$ and $CoS_{4.82}$.

EXAMPLE II

Nickel polysulfide was prepared in accordance with the procedure described in Example I but with nickel nitrate, $Ni(NO_3)_2$, as the soluble heavy metal salt with a resultant nickel polysulfide having an empirical stoichiometry of $NiS_{4.5}$ being obtained. Such nickel polysulfide was discovered to also have high metal conductivity.

EXAMPLE III

Copper polysulfide was prepared in accordance with the procedure described in Example I but with copper sulfate, $Cu(SO_4)_2$, as the soluble heavy metal salt with a resultant copper polysulfide having an empirical stoichiometry of $CuS_{3.7}$ being obtained. Such copper polysulfide was also found to have high metal conductivity.

EXAMPLE IV

Iron polysulfide was prepared in accordance with the procedure described in Example I but with iron sulfate, $FeSO_4.9H_2O$, as the soluble heavy metal salt with a resultant iron polysulfide having an empirical stoichiometry of $FeS_{4.5}$ being obtained.

The number of sulfurs in each of the polysulfide grouping of the metal polysulfides prepared as described in Examples I-IV are exemplified by the value of y in the stoichiometric formula $M_x{}^m(S_y)_z{}^{-2}$ for each of the polysulfides. Such y values are all greater than 2:

| | M | x | m | y | z |
|---|---|---|---|---|---|
| $CoS_{4.5}$ | Co | 1 | 2 | 4.5 | 1 |
| $CoS_{4.12}$ | Co | 1 | 2 | 4.12 | 1 |
| $CoS_5$ | Co | 1 | 2 | 5 | 1 |
| $CoS_{4.82}$ | Co | 1 | 2 | 4.82 | 1 |
| $NiS_{4.5}$ | Ni | 1 | 2 | 4.5 | 1 |
| $CuS_{3.7}$ | Cu | 1 | 2 | 3.7 | 1 |
| $FeS_{4.5}$ | Fe | 1 | 2 | 4.5 | 1 |

EXAMPLES V-XI

Button type cells were made with the dimensions 0.95" (24.5 mm) outside diameter by 0.12" (3 mm) height with each containing a lithium foil anode (440 mAhr) pressed on a nickel grid welded to the inside bottom of the cell container. Each of the cells contained an electrolyte of 0.75 $MLiClO_4$ in 1:1 (volume) of propylene carbonate and dimethoxyethane. The cathodes of the cells were made of the aforementioned metal polysulfides and the cells were discharged under loads of 1 and/or 2K $\Omega$. Construction details of the cathodes and the discharge capacities are given in Table II:

TABLE II

| Example No. | Polysulfide Cathode | Load | gm. wt. (active material) | Voltage Plateaus | Voltage Cutoff | Capacity (mAhr) | mAhr/gm | Whr/gm | Total Theoretical capacity (mAhr/gm) |
|---|---|---|---|---|---|---|---|---|---|
| V | $CoS_{4.1}$ | 1k$\Omega$ | 0.44 | 1.8 1.4 | 1.0 | 260 | 590 | 1.06 | 1,100 |
| VI** | $CoS_5$ | 1k$\Omega$ | 0.44 | 1.8 1.4 | 1.0 | 360 | 820 (1.39 Ahr/cm$^3$) | 1.51 (2.51 Whr/cm$^3$) | 1,220 |
| VII | $NiS_{4.5}$ | 1k$\Omega$ + 2k$\Omega$ | 0.05 | 1.75 + 1.3 | 1.0 | 28 | 560 | 0.96 | 1,190 |
| VIII | $NiS_{4.5}$ | 1k$\Omega$ + 2k$\Omega$ | 0.10 | 1.75 + 1.3 | 1.0 | 52 | 520 | 0.87 | 1,190 |
| IX | $CuS_{3.7}$ | 1k$\Omega$ + 2k$\Omega$ | 0.082 | 1.95–2.0 + 1.60 | 1.7 1.0 | 14 28 | 170 341 | 0.57* 0.57* | 1,090 1,090 |
| X | $CuS_{3.7}$ | 1k$\Omega$ + 2k$\Omega$ | 0.117 | 1.95–2.0 + 1.60 | 1.7 1.0 | 24 50 | 205 427 | 0.72* | 1,090 1,090 |
| XI | $FeS_{4.5}$ | 1k$\Omega$ | 0.13 | $^a$1.65 + 1.35 | 1.1 | 85 | 653 | 0.91 | 1,200 |
| XII | $FeS_{4.5}$ | 1k$\Omega$ | 0.26 | $^a$1.65 + 1.35 | 1.1 | 145 | 558 | 0.86 | 1,200 |

*Total Whr/gm
**density of 2.0 gm/cc when lightly pressed (5000 lb.)
$^a$plateaus at 2 k$\Omega$ discharge

EXAMPLE XIII

A cathode limited cell as in Example V was made with a 100 mg $CoS_5$ cathode admixed with 10% graphite and 5% PTFE binder. The cathode material was deoxygenated and the cell was discharged at 2k$\Omega$ with an open circuit voltage of about 2.8 volts and a running voltage of about 1.8 volts. The capacity of the cell to 1.5 volts was about 1 Ahr/gm and to 1.0 volt was about 1.1 Ahr/gm out of a theoretical capacity of 1.2 Ahr.

It is evident from the above examples that the capacities of the polysulfides of the present invention greatly exceed those of prior art metal sulfides. Furthermore, particularly in regard to the cobalt polysulfide over 90% of theoretical capacity has already been obtained. The polysulfide cathode materials of the present invention are utilizable in both aqueous and non-aqueous electrochemical cells since they are insoluble in the common aqueous and non-aqueous electrolyte solvents such as propylene carbonate, acetonitrile, dimethoxyethane, dioxolane, gamma-butyrolactene, tetrahydrofuran, methyl formate, dimethylsulfoxide, suflur dioxide, aqueous alkaline solutions and the like. Furthermore, such polysulfides are useful as high capacity cathodes in solid state cells wherein the electrolytes comprised of ionically conductive metal salts such as LiI are in the solid state.

In order to take full advantage of the high energy densities of the polysulfide materials of the present invention particularly because of their electrochemical potentials it is preferred that they be utilized in non-aqueous cells having alkali or alkaline earth metal anodes such as lithium wherein they provide cells with typical voltages between about 1.5–2.0 volts.

The above examples were given for the purpose of illustrating the present invention. Changes may be made in particular heavy metals, ratios of components, cell structure, components of such cells and the like without departing from the scope of the present invention as defined in the following claims.

What is claimed is:

1. An electrochemical cell comprising an anode, an electrolyte and a solid active cathode comprised of one or more heavy metal polysulfides with each having the formula $M_x{}^m(S_y)_z{}^{-2}$ wherein M is a heavy metal, S is sulfur, $mx=2z$ and y is greater than 2.

2. The electrochemical cell of claim 1 wherein said heavy metal is selected from the group consisting of cobalt, copper, nickel and iron.

3. The electrochemical cell of claim 1 wherein y is at least 3.5.

4. The electrochemical cell of claim 1 wherein said anode is comprised of a metal selected from alkali and alkaline earth metals.

5. The electrochemical cell of claim 4 wherein said anode is comprised of lithium.

6. The electrochemical cell of claim 5 wherein said heavy metal is cobalt.

7. The electrochemical cell of claim 6 wherein y is at least 4.

8. The electrochemical cell of claim 1 wherein said electrolyte is a fluid and said heavy metal polysulfide is substantially insoluble therein.

9. The electrochemical cell of claim 8 wherein said fluid electrolyte is non-aqueous.

10. The electrochemical cell of claim 1 wherein said electrolyte is a solid.

11. The cathode for an electrochemical cell comprising one or more heavy metal polysulfides with each having the formula $M_x{}^m(S_y)_z{}^{-2}$ wherein M is a heavy metal, S is sulfur, $mx=2z$ and y is greater than two, admixed with a binder.

12. The cathode of claim 11 wherein said cathode further comprises an electronic conductive material.

13. The cathode of claim 11 wherein said heavy metal sulfide is an amorphous reaction product precipitate in a solvent having a salt of said heavy metal and an alkali metal polysulfide dissolved therein.

14. The cathode of claim 13 wherein said alkali metal is sodium.

15. The cathode of claim 14 wherein said heavy metal salt is selected from the group consisting of $Ni(NO_3)_2$, $FeSO_4$, $Cu(SO_4)_2$ and $CoSO_4$.

16. The cathode of claim 15 wherein y is greater than 3.5.

17. The cathode of claim 13 wherein said solvent is water.

18. A non-aqueous electrochemical cell comprising a lithium anode, a fluid non-aqueous electrolyte and a cathode comprised of a heavy metal polysulfide having an empirical stoichiometric formula $MS_y$ wherein M is selected from the group consisting of cobalt, copper, nickel and iron; S is sulfur and y is greater than 3.5.

* * * * *